(12) United States Patent
Chang et al.

(10) Patent No.: US 11,392,190 B2
(45) Date of Patent: Jul. 19, 2022

(54) SYSTEM AND METHOD FOR UTILIZING A TABLET KICKSTAND TO POWER UP AN INFORMATION HANDLING SYSTEM

(71) Applicant: Dell Products L.P., Round Rock, TX (US)

(72) Inventors: Yaotsung Chang, Taipei (TW); Chih-Lang Lin, Taipei (TW); Li Chung Liu, Zhongli (TW)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 16/802,861

(22) Filed: Feb. 27, 2020

(65) Prior Publication Data

US 2021/0271304 A1 Sep. 2, 2021

(51) Int. Cl.
*G06F 1/00* (2006.01)
*G06F 1/3203* (2019.01)
*G06F 1/16* (2006.01)
*G06F 1/26* (2006.01)

(52) U.S. Cl.
CPC ............ *G06F 1/3203* (2013.01); *G06F 1/166* (2013.01); *G06F 1/1666* (2013.01); *G06F 1/26* (2013.01)

(58) Field of Classification Search
CPC ....... G06F 1/3208; G06F 1/166; G06F 1/1666
USPC ....................................................... 713/300
See application file for complete search history.

(56) References Cited

U.S. PATENT DOCUMENTS

| | | | | |
|---|---|---|---|---|
| 5,077,551 A | * | 12/1991 | Saitou ................... | G06F 1/1677 361/679.55 |
| 2003/0011972 A1 | * | 1/2003 | Koo ....................... | G06F 1/1679 361/726 |
| 2005/0038982 A1 | * | 2/2005 | Park ........................ | G06F 1/206 713/1 |
| 2005/0062715 A1 | * | 3/2005 | Tsuji ..................... | G06F 1/1677 345/158 |
| 2006/0139326 A1 | * | 6/2006 | Tsukamoto ........... | G06F 1/3218 345/158 |
| 2006/0238439 A1 | * | 10/2006 | Fuller ................... | G06F 1/1616 345/1.1 |
| 2010/0331063 A1 | * | 12/2010 | Grant .................... | G06F 1/1624 455/575.4 |
| 2011/0161710 A1 | * | 6/2011 | Huang .................. | G06F 1/1677 324/693 |
| 2011/0179864 A1 | * | 7/2011 | Raasch ................ | G11B 19/042 73/493 |
| 2012/0001943 A1 | * | 1/2012 | Ishidera ................ | G06F 3/0346 345/659 |

(Continued)

*Primary Examiner* — Volvick Derose
(74) *Attorney, Agent, or Firm* — Baker Botts L.L.P.

(57) ABSTRACT

A system and method for powering up a portable information handling system based on a position of a kickstand and a position of a keyboard relative to a chassis. When a kickstand is opened, a power control system determines if a keyboard is attached and opened. If the keyboard is not attached and the kickstand is opened, the power control system initiates powering up the portable information handling system. If the keyboard is attached and closed, the portable information handling system is not powered up. If the keyboard is attached and opened, the power control system initiates powering up the portable information handling system. If the kickstand is opened and the keyboard is opened, the power control system initiates powering up the portable information handling system.

18 Claims, 5 Drawing Sheets

(56) References Cited

U.S. PATENT DOCUMENTS

| | | | |
|---|---|---|---|
| 2012/0278638 A1* | 11/2012 | Wang | G06F 1/1677 |
| | | | 361/679.02 |
| 2013/0106704 A1* | 5/2013 | Vidal | G06F 3/0219 |
| | | | 345/169 |
| 2013/0232353 A1* | 9/2013 | Belesiu | G06F 3/023 |
| | | | 702/56 |
| 2014/0043259 A1* | 2/2014 | Park | G06F 1/1677 |
| | | | 345/173 |
| 2014/0146446 A1* | 5/2014 | Matsuda | G06F 3/0202 |
| | | | 361/679.01 |
| 2014/0293534 A1* | 10/2014 | Siddiqui | G06F 1/1637 |
| | | | 248/688 |
| 2015/0097788 A1* | 4/2015 | Sip | G06F 1/3262 |
| | | | 345/173 |
| 2017/0010636 A1* | 1/2017 | Shao | G06F 1/1616 |
| 2020/0081518 A1* | 3/2020 | Yang | G06F 1/1677 |
| 2021/0271304 A1* | 9/2021 | Chang | G06F 1/166 |

* cited by examiner

| 402 | OPERATION SEQUENCE 404 | | SYSTEM POWER STATE CHANGES 406 | | | | BIOS OPTION 408 |
|---|---|---|---|---|---|---|---|
| | 1 | 2 | S0 | MS | S4 | S5 | |
| 1 | WITHOUT FOLIO KB | KICKSTAND CLOSE | S0 → S0 | MS → MS | S4 → S4 | S5 → S5 | ENABLE (KICKSTAND SWITCH DETECTION AND ENABLE KEYBOARD OPEN POWER ON) OR DISABLE (WITHOUT KEYBOARD OPEN POWER ON) |
| 2 | | KICKSTAND OPEN | S0 → S0 | MS → S0 | S4 → S0 | S5 → S0 | |
| 3 | FOLIO KB CLOSE | KICKSTAND CLOSE | S0 → S0 | MS → MS | S4 → S4 | S5 → S5 | |
| 4 | | KICKSTAND OPEN | S0 → S0 | MS → MS | S4 → S4 | S5 → S5 | |
| 5 | FOLIO KB OPEN | KICKSTAND CLOSE | S0 → S0 | MS → MS | S4 → S4 | S5 → S5 | |
| 6 | | KICKSTAND OPEN | S0 → S0 | MS → S0 | S4 → S0 | S5 → S0 | |
| 7 | KICKSTAND CLOSE | FOLIO KB OPEN | S0 → S0 | MS → S0 | S4 → S4 | S5 → S5 | |
| 8 | KICKSTAND OPEN | | S0 → S0 | MS → S0 | S4 → S0 | S5 → S0 | |

SYSTEM AND METHOD FOR UTILIZING A TABLET KICKSTAND TO POWER UP AN INFORMATION HANDLING SYSTEM

BACKGROUND

Field of the Disclosure

This disclosure relates generally to information handling systems and, more particularly, to systems and methods for changing an operational state of a portable information handling system based on a position of a kickstand.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems provide the functionality of an information handling system in compact devices such as notebook computers, tablet computers and 2-in-1 tablet-laptop combination computers. Portable information handling systems may be coupled to a constant power source or a battery power source. Portable information handling systems may operate in a working state (also referred to as active system power state (S0)) or may power down to one or more sleep states (also referred to as system power states S1-S4) and a shutdown state (also referred to as system power state S5) to conserve power or for other reasons.

SUMMARY

In one aspect, a portable information handling system comprises a chassis with a detachable keyboard, a kickstand and a power control system for determining whether to change an operational state of the portable information handling system based on the position of the kickstand and the keyboard.

If the keyboard is detached, the portable information handling system may be operating as a tablet. If the kickstand is opened when the portable information handling system is operating as a tablet, the power control system powers up the portable information handling system to the active system power state (S0).

If the keyboard is attached, the portable information handling system may be operating as a tablet or a laptop. If the kickstand is opened when the keyboard is attached, the power control system determines if the keyboard is opened. If the keyboard is opened, the power control system powers up the portable information handling system to the active system power state (S0). If the keyboard is closed, the power control system may determine an accidental opening has occurred and maintain the portable information handling system in its present system power state. If the user closes the keyboard while the kickstand is opened, the portable information handling system transitions to an inactive system power state (S1-S4).

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, a portable information handling system may include a chassis containing an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, a portable information handling system may be a laptop, a tablet, a 2-in-1, or another portable device and may vary in size, shape, performance, functionality, and price. The portable information handling system includes one or more processing resources such as a central processing unit (CPU) or hardware or software control logic. Additional components of the portable information handling system may include one or more storage devices, one or more communications ports for communicating with external devices as well as various input and output (I/O) devices, such as a keyboard, a mouse, and a video display. The portable information handling system may also include one or more buses operable to transmit communication between the various hardware components.

Particular embodiments are best understood by reference to FIGS. 1-5 wherein like numbers are used to indicate like and corresponding parts.

Figure 1:
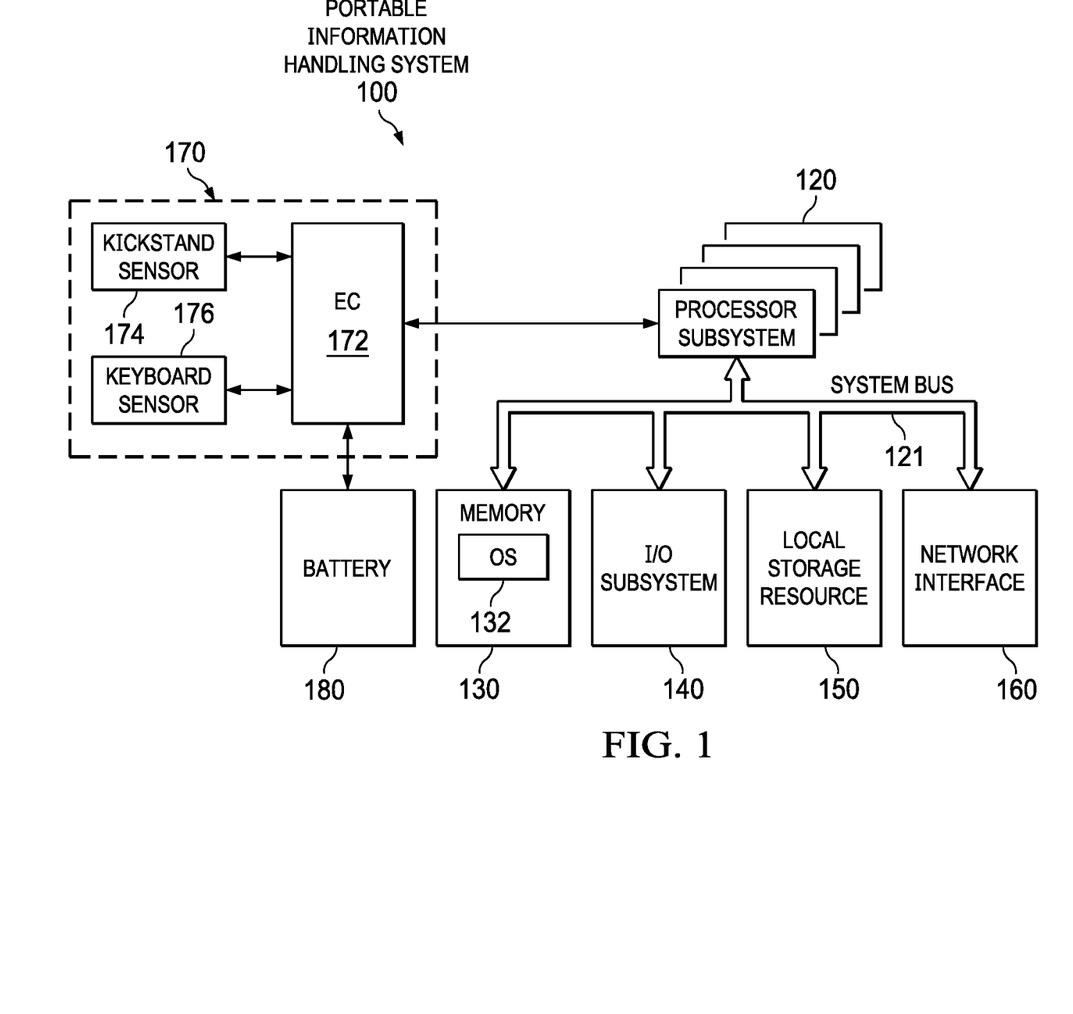
FIG. 1 is a block diagram of selected elements of an embodiment of a portable information handling system with a power control system for determining a system power state for the portable information handling system based on a keyboard and a kickstand.

FIG. 1 illustrates a block diagram depicting selected elements of an embodiment of portable information handling system 100. As described herein, portable information handling system 100 may represent a portable computing device, such as a 2-in-1 tablet device operated by a user.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160 and a power control system 170 comprising an embedded controller 172, a kickstand sensor 174 and a keyboard sensor 176.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130).

System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which an external device (e.g., a keyboard) may be added or removed while portable information handling system 100 is operating.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand. For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As illustrated in FIG. 1, power control system 170 may include embedded controller (EC) 172 configured to communicate with kickstand sensor 174, keyboard sensor 176, battery 180 and processor subsystem 120 to facilitate portable information handling system 100 changing its operational state on based on a position of a keyboard and a kickstand while preventing accidental powering on of portable information handling system 100.

Figure 2:
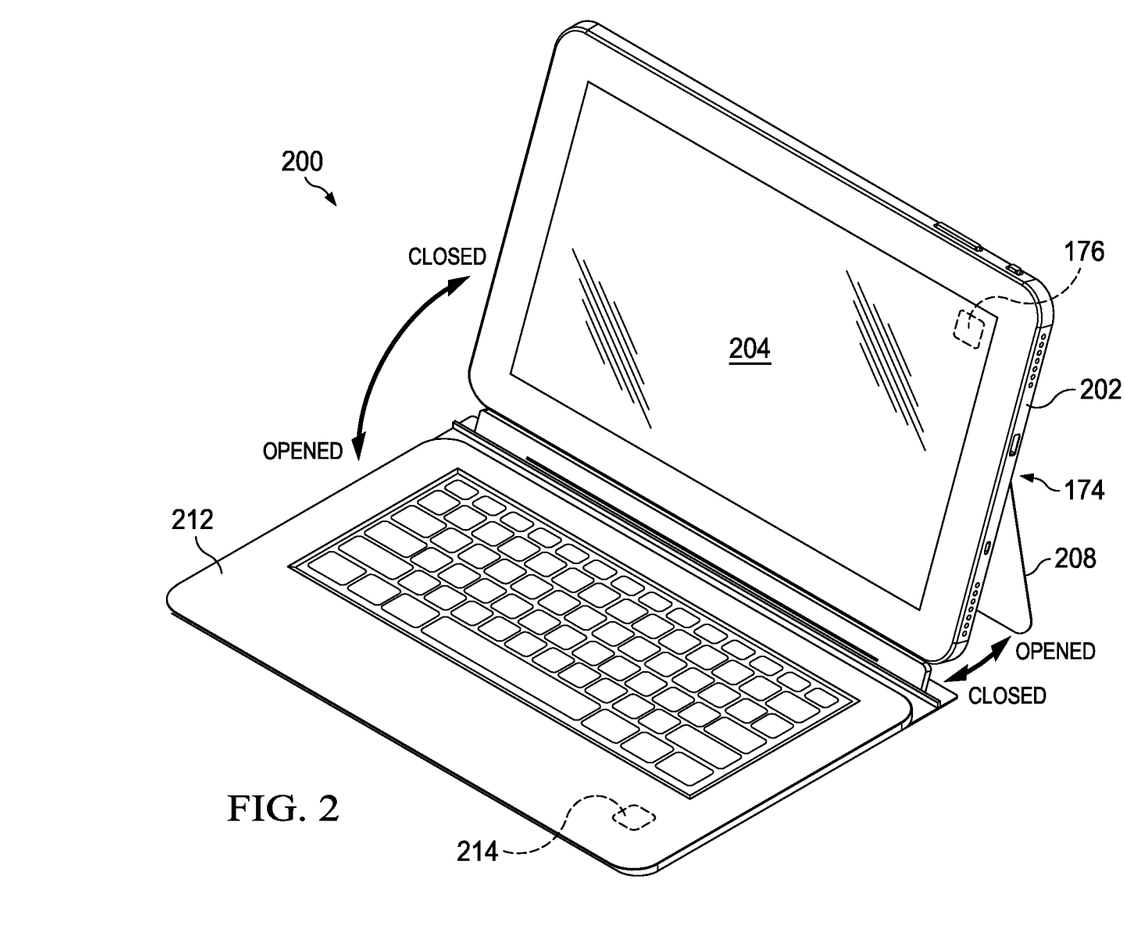
FIG. 2 is a perspective view of a chassis of a portable information handling system utilizing a kickstand sensor and a keyboard sensor for determining a system power state for the portable information handling system of FIG. 1.

Referring to FIGS. 1 and 2, components of portable information handling system 100 described above may be configured in a portable device 200 which allows a user to utilize the functionality of information handling system 100 in a laptop configuration (shown) or a tablet configuration (not shown).

Portable device 200 comprises chassis 202 and keyboard 212, which may be detached from chassis 202 or attached to chassis 202 and closed or opened. Chassis 202 contains components of portable information handling system 100 and display 204 for displaying information to a user. Display 204 may have touch screen functionality to allow a user to enter information and interact with portable information handling system 100.

Keyboard 212 may be detachably and hingedly coupled to chassis 202. A user may detach keyboard 212 from chassis 202 and portable information handling system 100 may operate in a tablet configuration, in which display 204 contains touch screen functionality for receiving information and instructions from the user. Keyboard 212 may be formed as part of a lid, wherein a user may attach keyboard 212 to chassis 202 to protect display 204 when transporting and storing portable device 200. Keyboard 212 facilitates portable information handling system 100 operating in either a tablet or laptop configuration, in which display 204 contains touch screen functionality for receiving information and instructions from the user and keyboard 212 contains functionality for receiving information and instructions from the user. In some embodiments, keyboard 212 may be attached to chassis 202 and rotated to an angle to allow the user to operate portable information handling system 100 in a tablet configuration or a laptop configuration.

Portable device 200 comprises kickstand 208 hingedly coupled to chassis 202. As depicted in FIG. 2, kickstand 208 may be opened to support chassis 202 in an upright orientation. Kickstand 208 may also be closed.

Portable device 200 comprises kickstand sensor 174 for detecting when kickstand 208 is closed or opened. In some embodiments, kickstand sensor 174 comprises a switch, wherein the switch is in a first position when kickstand 208 is closed and the switch is in a second position when kickstand 208 is opened.

Portable device 200 may include keyboard sensor 176 for determining when keyboard 212 is opened or closed. In some embodiments, keyboard sensor 176 may be a Hall effect sensor and keyboard 212 comprises magnet 214. Keyboard sensor 176 based on a Hall effect sensor may determine whether keyboard 212 is opened or closed based on a magnetic field strength associated with magnet 214 and may further determine whether keyboard 212 is opening or closing based on whether the magnetic field strength is decreasing or increasing. In some embodiments, a signal from keyboard sensor 176 may indicate that keyboard 212 is slightly ajar but not opened enough to allow a user to utilize keyboard 212 or portable information handling system 100.

Power Control System—Overview

Referring to FIGS. 1 and 2, components of a power control system 170 may be configured for powering up or powering down portable information handling system 100 based on signals received from kickstand sensor 174 and keyboard sensor 176. As illustrated in FIG. 1, power control system 170 may include embedded controller (EC) 172, which may include a second processor included within portable information handling system 100 for certain management tasks, including supporting communication and providing various functionality with respect to determining when to power up or power down portable information handling system 100. Thus, EC 172 may have access to memory storing instructions executable to determine when to power up or power down portable information handling system 100, discussed below in more detail.

Embedded controller 172 may execute firmware, which may represent one or more input/output interfaces or signals that embedded controller 172 can use to communicate with other elements of portable information handling system 100. In some embodiments, EC 172 may receive a signal to power up portable information handling system 100. For example, a signal may be received from a power button activated by a user wanting portable information handling system 100 to power up. Alternatively, a signal may be received from kickstand sensor 174 and/or keyboard sensor 176 indicating a user is opening kickstand 208 and/or keyboard 212 because the user wants to use portable information handling system 100. If signals are received from each of kickstand sensor 174 and keyboard sensor 176, the sequence in which the signals are received may indicate whether the user is configuring portable device 200 to operate portable information handling system 100 as a laptop or a tablet.

Power Control System for a Portable Information Handling System

Figure 3:
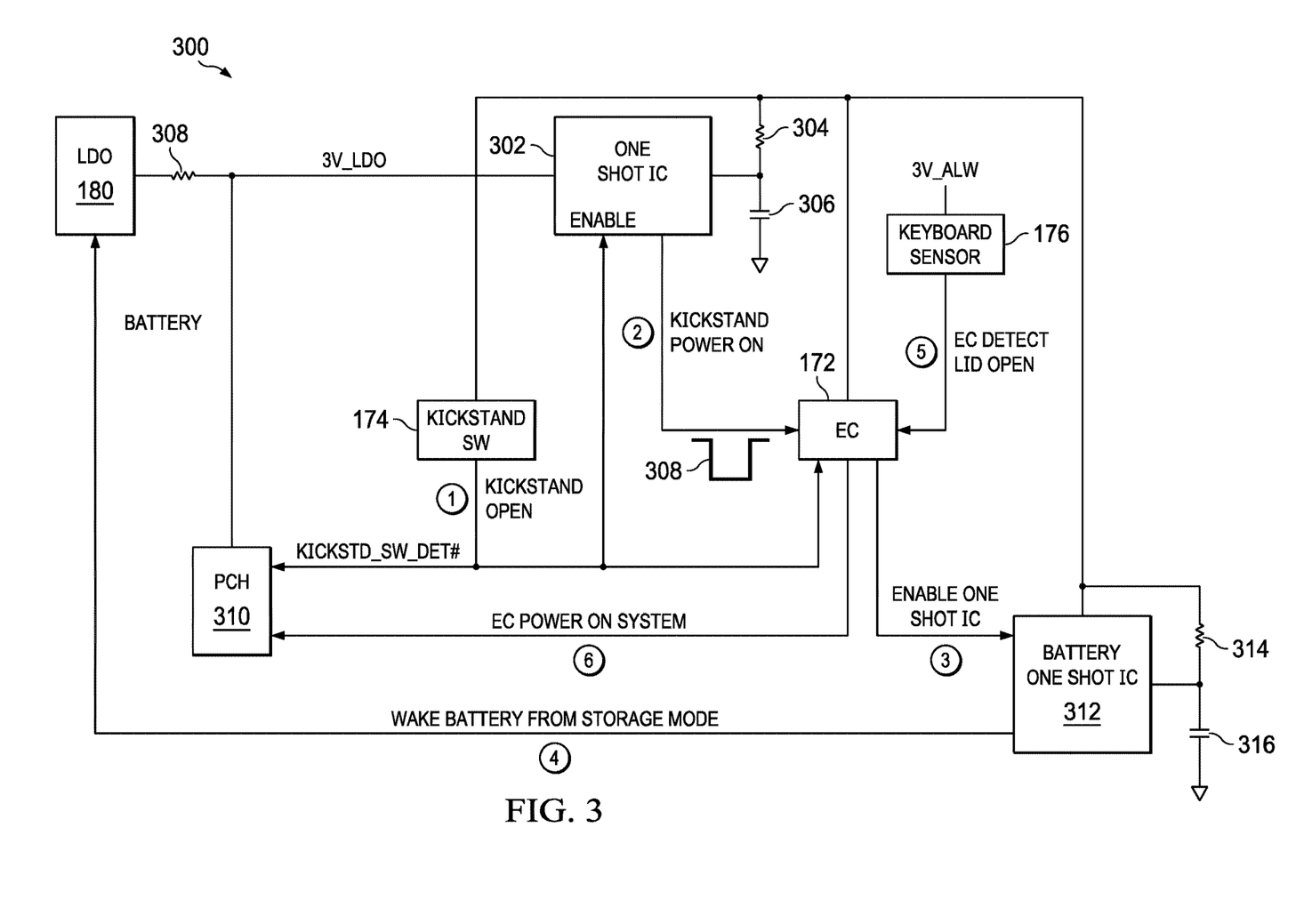
FIG. 3 is a circuit diagram depicting a power control system for determining a system power state for the portable information handling system of FIG. 1.

Power control system 170 may determine when to power on portable information handling system 100 based on the position of kickstand 208 and keyboard 212. FIG. 3 depicts a block diagram of one embodiment of system 300 for determining when to power up portable information handling system 100 based on the configuration of kickstand 208 and keyboard 212.

As depicted in FIG. 3, system 300 comprises embedded controller (EC) 172, kickstand sensor 174 and keyboard sensor 176, and further comprises platform controller hub (PCH) 310 and electronic circuits 302 and 312, all coupled to battery 180 for receiving power.

As depicted in FIG. 3, kickstand sensor 174 is communicatively coupled to electronic circuit 302, EC 172 and PCH 310. In some embodiments, kickstand sensor 174 comprises a switch integrated into a hinge, wherein opening or closing kickstand 208 causes kickstand sensor 174 to send a signal. Kickstand sensor 174 may be configured to send a signal whenever kickstand 208 is opened or closed.

As depicted in FIG. 3, electronic circuit 302 may be communicatively coupled to kickstand sensor 174 such that a signal sent by kickstand sensor 174 is received by electronic circuit 302. As depicted in FIG. 3, electronic circuit 302 may be a one-shot integrated circuit (IC) with an external resistance 304 and an external capacitance 306. When kickstand 208 is opened, the signal sent by kickstand sensor 174 triggers electronic circuit 302 to generate pulse 308 having an output voltage (e.g., 3V) for a length of time. Electronic circuit 302 is communicatively coupled to EC 172 such that pulse 308 is transmitted to EC 172.

EC 172 is communicatively coupled to electronic circuit 302 for receiving pulse 308, is communicatively coupled to kickstand sensor 174 for receiving a signal indicating kickstand 208 is opened and is communicatively coupled to keyboard sensor 176 for receiving signals indicating keyboard 212 is opened or closed.

EC 172 is configured to receive a signal from kickstand sensor 174 and send a signal to battery electronic circuit 312.

Electronic circuit 312 is communicatively coupled to EC 172 and may receive a signal from EC 172. As depicted in FIG. 3, battery electronic circuit 312 may be a one-shot integrated circuit (IC) with an external resistance 314 and an external capacitance 316. In some embodiments, when EC 172 sends a signal to battery electronic circuit 312, battery electronic circuit 312 is triggered to generate an output voltage (e.g., 3V) for a length of time for waking battery 180 from an advanced storage mode. In some embodiments, battery 180 may be a low-dropout (LDO) battery.

As depicted in FIG. 3, keyboard sensor 176 may send a signal to EC 172 indicating keyboard 212 is opened.

EC 172 may be further configured to determine, based on the signal received from kickstand sensor 174 indicating kickstand 208 is opened and the signal received from keyboard sensor 176 indicating keyboard 212 is opened, whether a user is wanting to use portable information handling system 100. EC 172 may be configured to send a signal to PCH 310 to power up portable information handling system 100.

Platform controller hub (PCH) 310 is communicatively coupled to kickstand sensor 174 and EC 172 and may be communicatively coupled to other components of portable information handling system 100, such as processor subsystem 120 depicted in FIG. 1 to power up portable information handling system 100.

System Power States for Portable Information Handling System

Figure 4:
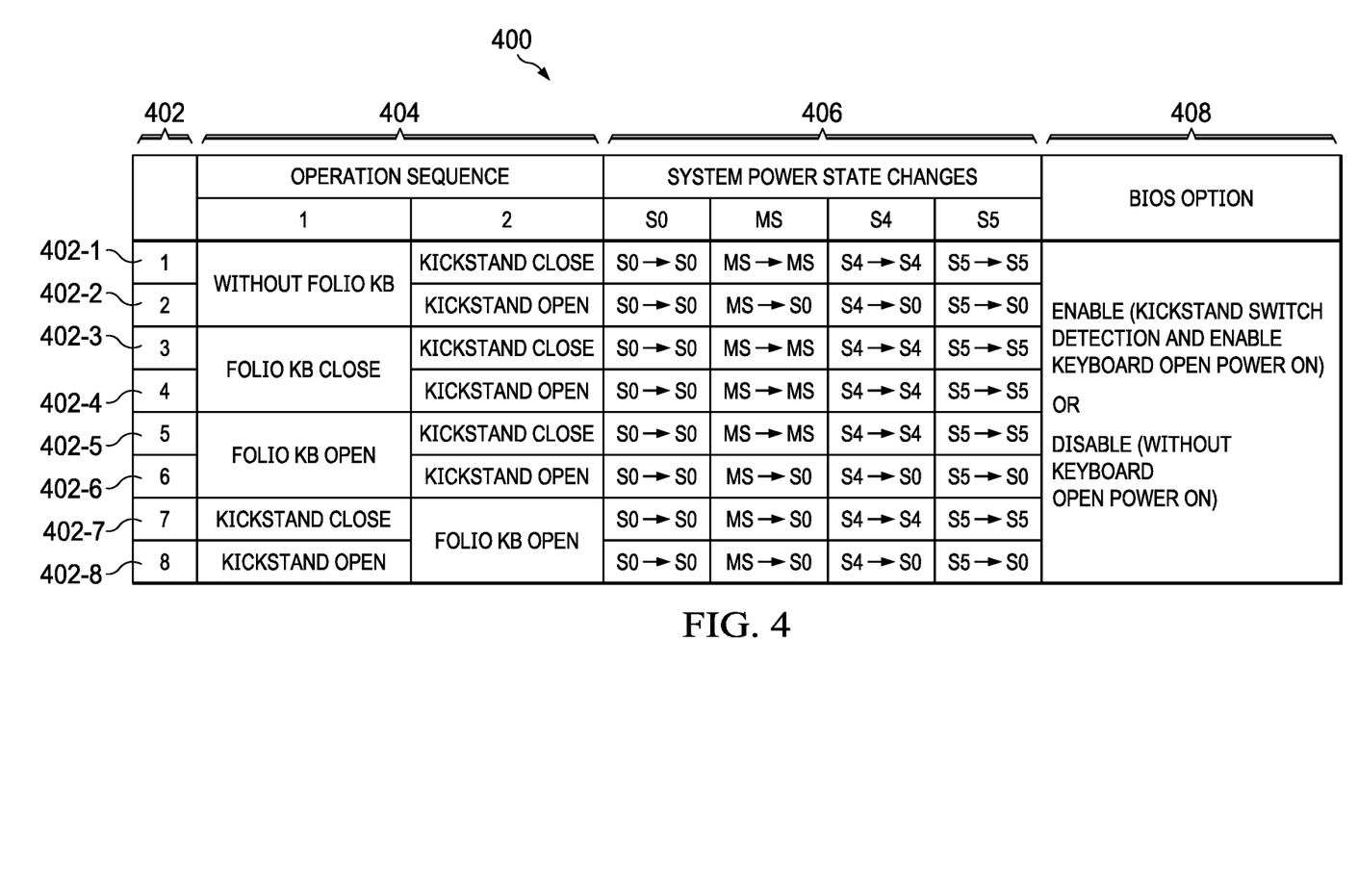
FIG. 4 is a table depicting system power state changes for various configurations of a keyboard and a kickstand in the portable information handling system of FIG. 1.

FIG. 4 depicts a table 400 of a plurality of scenarios 402-1 to 402-8, in which each scenario comprises an operation sequence 404 associated with portable device 200 and the resulting system power state changes 406 to portable information handling system 100.

As depicted in scenarios 402-1 to 402-8 of FIG. 4, for any operation sequence 404, portable information handling system 100 may transition from one of several system power states including modern standby (MS), hibernation (S4) and complete shutdown (S5) to system power state (S0) (an active or working state).

In a first scenario 402-1, in an operation sequence 404 in which portable device 200 is configured with keyboard 212 detached from chassis 202, if kickstand 208 is closed, no system power state changes occur in portable information handling system 100. Thus, if keyboard 212 is detached from chassis 202 and portable information handling system 100 is operating in the active system power state (S0), is operating in modern standby (MS) mode, is hibernating (S4) or shut down (S5) and kickstand 208 is closed, portable information handling system 100 remains in the active system power state (S0), in modern standby (MS), in hibernation (S4) or shut down (S5).

In a second configuration 402-2, in an operation sequence 404 in which portable device 200 is configured with keyboard 212 detached from chassis 202, if kickstand 208 is opened, power control system 300 may initiate changes to the system power state of portable information handling system 100. If portable information handling system 100 is operating in the active system power state (S0) and kickstand 208 is opened, portable information handling system 100 continues to function as a tablet and a user is able to orient portable device 200 in an upright configuration. Notably, if portable information handling system 100 is operating in a modern standby (MS) mode, is hibernating (S4) or is completely shut down (S5) and kickstand 208 is opened, power control system 300 may power up portable information handling system 100 to the active system power state (S0).

In third and fourth configurations 402-3 and 402-4, in an operation sequence 404 in which keyboard 212 is attached to chassis 202 and closed, a user is generally unable to view display 204 or interact with portable information handling system 100 using either touch screen functionality or keyboard 212. Accordingly, power control system 300 may be configured to maintain portable information handling system 100 in its present system power state (S0, MS, S4 or S5), regardless of whether kickstand 208 is opened or closed.

In a fifth configuration 402-5, in an operation sequence 404 in which keyboard 212 is attached to chassis 202 and opened, if kickstand 208 is closed, no changes are made to the system power state of portable information handling system 100. Thus, if portable information handling system 100 is operating in the active system power state (S0), in modern standby (MS), hibernating (S4) or shut down (S5) and kickstand 208 is closed, portable information handling system 100 continues to operate in the active system power state (S0), in modern standby (MS), in hibernation (S4) or shut down (S5).

In a sixth configuration 402-6, in an operation sequence 404-6 in which keyboard 212 is attached to chassis 202 and opened, if kickstand 208 is opened, system 300 may initiate changes to the system power state of portable information handling system 100. If portable information handling system 100 is operating in the active system power state (S0), in modern standby (MS) mode, in hibernation (S4) or shut down (S5) and the kickstand is opened, power control system 300 may power up portable information handling system 100 to the active system power state (S0).

In a seventh configuration 402-7, in an operation sequence 404 in which keyboard 212 is attached to chassis 202 and kickstand 208 is closed, if keyboard 212 is opened, system 300 may initiate changes to the system power state of portable information handling system 100. If portable information handling system 100 is operating in the active system power state (S0) with kickstand 208 opened and keyboard 212 is then opened, portable information handling system 100 continues to operate in the active system power state (S0). Notably, if portable information handling system 100 is operating in modern standby (MS) mode and keyboard 212 is opened, power control system 300 may power up portable information handling system 100 to the active system power state (S0), but if portable information handling system 100 is hibernating (S4) or is completely shut down (S5) and keyboard 212 is opened, portable information handling system 100 remains in hibernation (S4) or shut down (S5).

In an eighth configuration 402-8, in an operation sequence 404-8 in which keyboard 212 is attached to chassis 202 and kickstand 208 is opened, if keyboard 212 is then opened, system 300 may initiate changes to the system power state of portable information handling system 100. If portable information handling system 100 is operating in the active system power state (S0) with kickstand 208 opened and keyboard 212 is opened, portable information handling system 100 remains in the active system power state (S0) and a user is able to orient portable device 200 in an upright configuration. Notably, if portable information handling system 100 is operating in modern standby (MS) mode, is hibernating (S4) or is completely shut down (S5) and keyboard 212 is opened, power control system 300 may power up portable information handling system 100 to the active system power state (S0).

It should be noted that embodiments may allow BIOS option 408 in which power control system 170 may be enabled or disabled.

Figure 5:
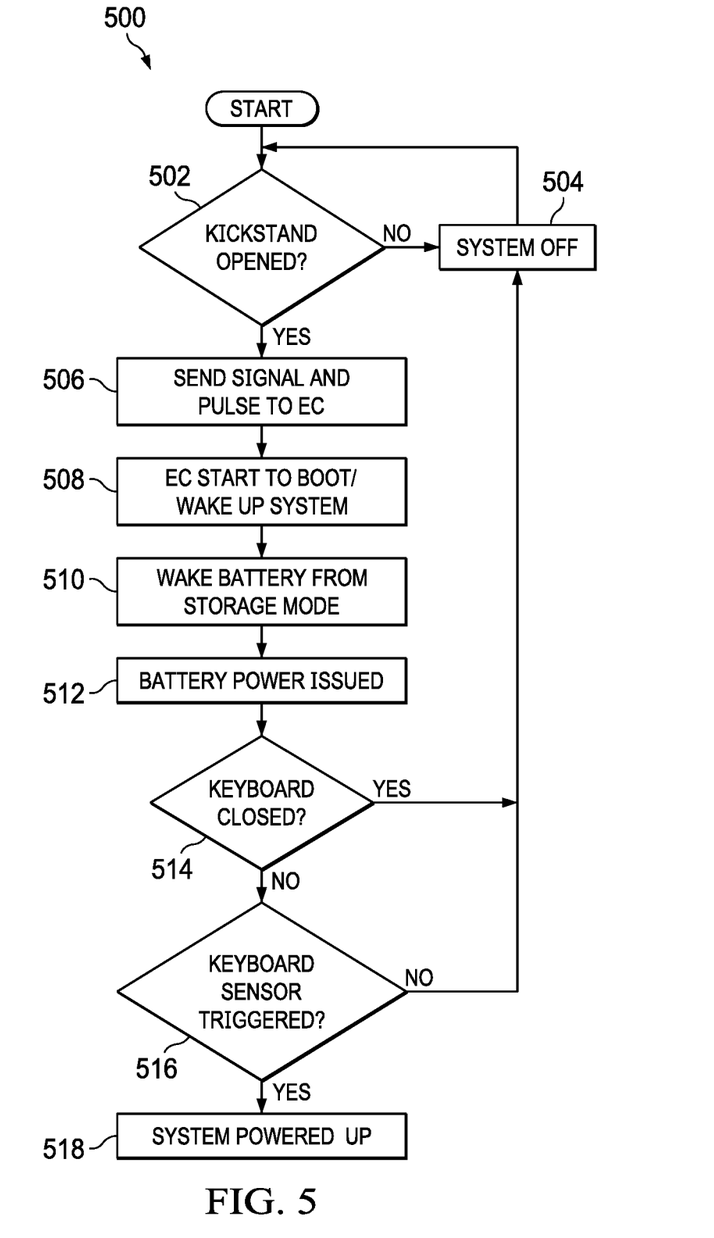
FIG. 5 is a flow diagram depicting a method for determining a system power state for the portable information handling system of FIG. 1.

FIG. 5 depicts a flow diagram, illustrating method 500 for determining whether to power up portable information handling system 100 based on one or more of a position of kickstand 208 and keyboard 212.

The method starts at step 502, when power control system 300 determines if kickstand 208 is opened. In some embodiments, determining if kickstand 208 is opened comprises kickstand sensor 174 sending a signal to EC 172.

If kickstand 208 has not been opened, then at step 504, power control system 300 does not initiate changes to the system power state of portable information handling system 100 and portable information handling system 100 remains powered off.

If kickstand 208 is opened, then at step 506, a signal and a pulse may be sent to EC 172. In some embodiments, an electronic circuit 302 such as a one-shot IC may send a signal to EC 172 and may also send a pulse for supplying a voltage for a predetermined length of time to EC 172.

At step 508, EC 172 may send a signal to PCH 310 to start to boot or wake up portable device 200. EC 172 may send a signal to wake up only certain components and not power up all of portable information handling system 100. For example, EC 172 may send a signal to components necessary to determine a configuration of portable device 200. In some embodiments, when the time period associated with pulse 308 ends, components that started to wake up may return to an inactive state.

At step 510, EC 172 may send a signal to wake a battery from an advanced storage mode. In some embodiments, EC 172 may send a signal to battery electronic circuit 312 to generate a pulse for supplying a voltage for a predetermined length of time to battery 180 to wake battery 180 from an advanced storage mode. Battery 180 may wake to a system power state for a predetermined length of time that allows battery 180 to supply power to components of power control system 300.

At step 512, the battery may begin issuing power. In some embodiments, battery 180 may issue or supply power to some components of portable information handling system 100 such as EC 172 and keyboard sensor 176.

At step 514, EC 172 may determine if keyboard 212 is closed. In some embodiments, EC 172 receives power from battery 180 and communicates with keyboard sensor 176 to determine if keyboard 212 is closed.

If EC 172 determines that keyboard 212 is closed, then at step 504, power control system 300 may keep portable information handling system 100 in a present system power state, including modern standby (MS), hibernation (S4) or shut down (S5). In some embodiments, when the time period associated with pulse 308 ends, EC 172 returns to an inactive state.

If EC 172 determines that keyboard 212 is opened, then at step 516, power control system 300 may determine if keyboard sensor 176 is triggered. In some embodiments, keyboard sensor 176 comprises keyboard sensor 176 and magnet 214 and EC 172 may determine if a magnetic field strength associated with magnet 214 is decreasing or below a threshold value. In some embodiments, EC 172 may determine keyboard 212 is detached from chassis 202.

If EC determines at step 516 that keyboard sensor 176 is not triggered, then power control system 300 may keep portable information handling system 100 in a present system power state, including modern standby (MS), hibernation (S4) or shut down (S5). In some embodiments, EC 172 may have sent a signal to wake battery 180 from an advanced storage mode. The signal may have included a time period for battery 180 to supply power to one or more components of power control system 300, wherein at the expiration of the time period, battery 180 returns to the advanced storage mode.

If EC determines at step 516 that keyboard sensor 176 is triggered, then method 500 ends at step 518 when power control system 300 powers up portable information handling system 100 from modern standby (MS), hibernation (S4) or complete shutdown (S5) to the active system power state (S0). In some embodiments, EC 172 communicates a signal to platform controller hub (PCH) 310 to power up portable information handling system 100 from modern standby (MS), hibernation (S4) or complete shutdown (S5) to active system power state (S0).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power control system for changing a system power state of a portable information handling system in a portable device comprising a chassis with a kickstand and a keyboard, the power control system comprising:
    a kickstand sensor for communicating a kickstand signal indicating whether the kickstand is opened or the kickstand is closed; and
    an embedded controller configured to:
        receive the kickstand signal;
            if the kickstand signal indicates the kickstand is opened, communicate a signal to power up the portable information handling system to an active system power state;
            if the kickstand signal indicates the kickstand is closed, maintain the system power state of the portable information handling system.

2. The power control system of claim 1, further comprising a keyboard sensor for communicating a keyboard signal indicating whether the keyboard is opened or the keyboard is closed;
    wherein the embedded controller is configured to:
    receive the keyboard signal and the kickstand sensor; and
        if the keyboard signal indicates the keyboard is closed, maintain the system power state of the portable information handling system;
        if the keyboard signal indicates the keyboard is opened and the kickstand signal indicates the kickstand is opened, communicate a signal to power up the portable information handling system to the active system power state.

3. The power control system of claim 1, further comprising a keyboard sensor for communicating a keyboard signal indicating whether the keyboard is opened or the keyboard is closed;
    wherein the embedded controller is configured to:
    receive the keyboard signal and the kickstand sensor; and
        if the kickstand signal indicates the kickstand is closed and the keyboard signal indicates the keyboard is opened when the portable information handling system is in a modern standby system power state, communicate a signal to power up the portable information handling system to the active system power state;
        if the kickstand signal indicates the kickstand is closed and the keyboard signal indicates the keyboard is opened when the portable information handling system is in one of a hibernation or shutdown system power state, maintain the system power state of the portable information handling system;
        if the keyboard signal indicates the keyboard is opened and the kickstand signal indicates the kickstand is opened, communicate a signal to power up the portable information handling system to the active system power state.

4. The power control system of claim 1, wherein the keyboard sensor comprises a Hall effect sensor.

5. The power control system of claim 1, wherein the kickstand sensor comprises a switch.

6. The power control system of claim 5, wherein the kickstand sensor is integrated in a kickstand hinge.

7. A portable device containing a portable information handling system, the portable device comprising:
a chassis comprising:
a kickstand hingedly coupled to the chassis;
a kickstand sensor associated with the kickstand for sending a kickstand signal;
a keyboard adapted for hingedly coupling to the chassis and detachment from the chassis;
a keyboard sensor associated with the keyboard for sending a keyboard signal;
an embedded controller communicatively coupled to the kickstand sensor and the keyboard sensor; and
a memory storing a set of instructions executable by the embedded controller for:
receiving the kickstand signal;
receiving the keyboard signal; and
sending a signal to power up the portable information handling system based on one of:
the keyboard is detached and the kickstand signal indicates the kickstand is opened; and
the keyboard signal indicates the keyboard is opened and the kickstand signal indicates the kickstand is opened.

8. The portable device of claim 7, further comprising an electronic circuit communicatively coupled to the kickstand sensor and the embedded controller, wherein:
the electronic circuit is configured to:
receive the kickstand signal from the kickstand sensor; and
transmit a pulse to the embedded controller in response to the kickstand signal; and
the embedded controller is configured to:
receive the pulse from the electronic circuit;
send a signal to a battery electronic circuit to wake a battery;
communicate with the keyboard sensor to receive a keyboard signal; and
send a signal to a platform controller hub to power up the portable information handling system if the keyboard signal indicates the keyboard is opened.

9. The portable device of claim 8, wherein the electronic circuit comprises a one-shot integrated circuit (IC).

10. The portable device of claim 7, wherein the embedded controller is configured to:
power up the portable information handling system to the active system power state in response to receiving the keyboard signal indicating the keyboard is opened after receiving the kickstand signal indicating the kickstand is opened.

11. The portable device of claim 7, wherein the embedded controller is configured to power up the portable information handling system to the active system power state if the embedded controller receives a signal from the kickstand sensor that the kickstand is opened and determines the keyboard is detached.

12. The portable device of claim 7, wherein the kickstand sensor comprises a switch.

13. The portable device of claim 7, wherein the keyboard sensor comprises:
a Hall effect sensor in the chassis; and
a magnet in the keyboard, wherein the Hall effect sensor is configured for sending a signal to the embedded controller based on one or more of a magnetic field strength and a rate of change of the magnetic field strength associated with the magnet.

14. A method implemented by an embedded controller (EC) for powering up a portable information handling system contained in a portable device having a detachable keyboard and a kickstand hingedly coupled to a chassis, the method comprising:
a kickstand sensor detecting the kickstand has been opened;
the kickstand sensor sending a signal to a first electronic circuit to enable the first electronic circuit;
the first electronic circuit sending a signal to the EC; and
the EC communicating with a keyboard sensor for determining if the keyboard is attached, wherein:
if the detachable keyboard is detached from the chassis, the method comprises the EC sending a signal to power up the portable information handling system to an active system power state;
if the detachable keyboard is attached to the chassis, the method comprises:
EC communicating with the keyboard sensor to determine if the detachable keyboard is closed or opened, wherein:
the detachable keyboard is closed, the method comprises maintaining the portable information handling system in an inactive system power state;
the detachable keyboard is opened, the method comprises the EC communicating a signal to power up the portable information handling system to the active system power state.

15. The method of claim 14, wherein the kickstand sensor comprises a switch integrated in a hinge, wherein opening the kickstand sends the kickstand signal to the embedded controller.

16. The method of claim 14, wherein:
the keyboard sensor comprises:
a Hall effect sensor in the chassis; and
a magnet in the keyboard; and
the method comprises the Hall effect sensor sending a signal to the embedded controller based on one or more of a magnetic field strength and a rate of change of the magnetic field strength associated with the magnet.

17. The method of claim 14, wherein:
the first electronic circuit is configured to:
receive the kickstand signal from the kickstand sensor; and
transmit a pulse to the embedded controller in response to the kickstand signal; and
the embedded controller is configured to:
receive the pulse;
send a signal to a battery electronic circuit to wake a battery;
communicate with the keyboard sensor to receive a keyboard signal; and
send a signal to a platform controller hub to power up the portable information handling system if the keyboard signal indicates the keyboard is opened.

18. The method of claim 17, wherein one or more of the first electronic circuit and the battery electronic circuit comprises a one-shot integrated circuit (IC).

* * * * *